United States Patent [19]

Lausberg et al.

[11] Patent Number: 5,162,422
[45] Date of Patent: Nov. 10, 1992

[54] THERMOPLASTIC POLYPROPYLENE-POLYAMIDE MOLDING COMPOSITIONS OF HIGH TOUGHNESS, RIGIDITY AND HEAT-DISTORTION RESISTANCE, AND THE PREPARATION THEREOF

[75] Inventors: Dietrich Lausberg, Ludwigshafen; Wolfgang F. Mueller, Neustadt; Erhard Seiler, Ludwigshafen, all of Fed. Rep. of Germany

[73] Assignee: BASF Aktiengesellschaft, Ludwigshafen, Fed. Rep. of Germany

[21] Appl. No.: 534,883

[22] Filed: Jun. 8, 1990

[30] Foreign Application Priority Data

Jun. 10, 1989 [DE] Fed. Rep. of Germany ....... 3918982

[51] Int. Cl.$^5$ .................. C08L 77/00; C08K 3/00; C08K 5/00
[52] U.S. Cl. ..................... 524/504; 524/522; 524/523; 525/66; 525/179
[58] Field of Search ............ 525/66; 524/504, 522, 524/523

[56] References Cited

U.S. PATENT DOCUMENTS

| | | | |
|---|---|---|---|
| 4,613,647 | 9/1986 | Yonaiyama et al. | 524/514 |
| 4,615,941 | 10/1986 | Lu | 428/327 |
| 4,780,505 | 10/1988 | Mashita et al. | 525/66 |
| 4,988,764 | 1/1991 | Nishio et al. | 525/66 |

FOREIGN PATENT DOCUMENTS

| | | |
|---|---|---|
| 0188123 | 7/1986 | European Pat. Off. . |
| 0235876 | 8/1987 | European Pat. Off. . |
| 0245966 | 11/1987 | European Pat. Off. . |
| 0262796 | 4/1988 | European Pat. Off. . |

*Primary Examiner*—Ana L. Carrillo
*Attorney, Agent, or Firm*—Oblon, Spivak, McClelland, Maier & Neustadt

[57] ABSTRACT

Novel polypropylene-polyamide molding compositions which comprise, based on 100 parts by weight of the molding compositions, A) 10 to 89.9 parts by weight of one or more polypropylene homopolymer and/or copolymer,
B) 10 to 89.9 parts by weight of one or more polyamide,
C) 0.1 to 5.0 parts by weight of one or more olefinically unsaturated carboxylic acid and/or one or more olefinically unsaturated carboxylic acid derivate,
D) 0 to 3.0 parts by weight of an impact modifier, and
E) 0 to 60.0 parts by weight of a reinforcing agent and/or additive, are prepared by melting together components (A), (C) and, if desired (D) at from 200° to 300° C. in a first reaction step and then, in a second reaction step, introducing component (B) and, if appropriate, components (D) and/or (E) into the modified melt obtained, and melting together the components.

The molding compositions obtained are used for the production of moldings.

4 Claims, No Drawings

THERMOPLASTIC POLYPROPYLENE-POLYAMIDE MOLDING COMPOSITIONS OF HIGH TOUGHNESS, RIGIDITY AND HEAT-DISTORTION RESISTANCE, AND THE PREPARATION THEREOF

The present invention relates to novel polypropylene-polyamide molding compositions which, in each case based on 100 parts by weight, comprise A) 10 to 89.9 parts by weight of one or more polypropylene homopolymer and/or copolymer, B) 10 to 89.9 parts by weight of one or more polyamide, C) 0.1 to 5.0 parts by weight of one or more olefinically unsaturated carboxylic acid and/or one or more olefinically unsaturated carboxylic acid derivative, D) 0 to 30.0 parts by weight of an impact modifier, and E) 0 to 60.0 parts by weight of a reinforcing agent and/or additive.

Polypropylene homopolymers and copolymers (also abbreviated to PP below) generally have good mechanical properties, good processing properties and water resistance. However, the use of polypropylenes is limited by the inadequate heat-distortion resistance, unsatisfactory low-temperature toughness and poor resistance to organic solvents.

It may be possible to at least reduce or eliminate these drawbacks by adding polyamides (also abbreviated to PA below), which have the properties mentioned to an outstanding extent. On the other hand, however, PA has an undesirably high water-absorption capacity.

However, the incompatibility of PP with PA is particularly disadvantageous, meaning that simple mixtures do not have a level of properties which can be utilized in industry.

Glass fiber-reinforced PP-PA compositions are described in DE-A-3,507,128 (U.S. Pat. No. 4,613,647). In order to improve the adhesion between the nonpolar PP and the glass fibers, a PP which has been modified by means of unsaturated carboxylic acids or an anhydride thereof is employed. However, the increase in the adhesion between PP and glass fibers impairs the appearance of moldings produced therefrom.

In order to reduce the glass fiber content and to improve the appearance, PA, in particular nylon 6 or nylon 66, and glass fibers have therefore been added to PP. However, compositions of this type, which comprise PP, modified PP, a customary PA, for example nylon 6 or nylon 66, and glass fibers, have inadequate mechanical strength, and the hardness is considerably reduced due to absorption of moisture by the nylon types employed.

According to EP-A-200,184, it was possible to eliminate this drawback by using a specific PA prepared by polycondensation of metaxylenediamine and adipic acid (nylon MXD6). This PP composition has the disadvantage that the synthesis components are not readily accessible and also that the mechanical properties, in particular the low-temperature toughness, are unsatisfactory.

The toughness of thermoplastic molding compositions comprising 10 to 90% by weight of a PP modified by means of acid groups, possibly non-modified PP, and 90 to 10% by weight of a PA and additionally containing 2 to 30 parts by weight of an epoxy-containing copolymer per 100 parts by weight of the mixture and described in EP-A-0,180,302 is also unsatisfactory.

EP-A-188,123 (U.S. Pat. No. 4,615,941) discloses films comprising PP and PA which contain, as coupling agents, ethylenemethyl acrylate, ethyleneacrylic acid, an ionomer, ethylenevinyl acetate, anhydride-modified PP, polyethyloxazolines or stearylstearamide. Although no mention is made of the properties of the films, it is however claimed that polyamide is embedded in the film in the form of particles having a size of 8 μm or smaller. However, further experiments have shown that none of the coupling agents mentioned gives a positive result in molding compositions.

EP-A-0,235,876 describes thermoplastic mixtures which contain 1 to 95% by weight of a PA and 99 to 5% by weight of a chemically modified mixture of a polyolefin and another polymer, the mixture having been modified by means of an unsaturated carboxylic acid or a carboxylic anhydride. Molding compositions of this type containing carboxylic acid-modified or carboxylic anhydride-modified PP or polyethylene have unsatisfactory toughness and, if they contain modified polyethylene, also unsatisfactory heat-distortion resistance.

It is an object of the present invention to provide thermoplastic PP-PA molding compositions having high toughness, rigidity and heat-distortion resistance.

Surprisingly, we have found that this object is achieved by modifying PP by means of an olefinically unsaturated carboxylic acid or a corresponding carboxylic acid derivative at elevated temperature in a customary mixer, subsequently mixing the thus modified PP and PA, and melting the components.

The present invention thus relates to thermoplastic polypropylene polyamide molding compositions which, in each case based on 100 parts by weight of the molding compositions, comprise A) 10 to 89.9 parts by weight, preferably 20 to 85 parts by weight, of one or more polypropylene homopolymer and/or copolymer, B) 10 to 89.9 parts by weight, preferably 15 to 75 parts by weight, of one or more polyamide, C) 0.1 to 5.0 parts by weight, preferably 0.2 to 2 parts by weight, of one or more olefinically unsaturated carboxylic acid and/or of one or more olefinically unsaturated carboxylic acid derivative, D) 0 to 30.0 parts by weight, preferably 0 to 25 parts by weight, of an impact modifier and E) 0 to 60.0 parts by weight, preferably 0 to 50 parts by weight, of a reinforcing agent and/or additive.

The present invention furthermore relates, corresponding to patent claims 5 to 9, to processes for the preparation of polypropylene-polyamide molding compositions by melting together components (A) to (C) and, if desired, (D) and/or (E) in a customary mixer, preferably an extruder, at from 200° to 300° C., which processes comprise melting together components (A), (C) and, if desired, (D) in a first reaction step and then, in a second reaction step, expediently in the same mixer and at the same temperature, introducing component (B) and, if appropriate, components (D) and/or (E) into the modified melt obtained, and melting together component (A) which has been modified by means of (C) or components (A) and (D) which may have been modified by means of (C), and component (B) and, if appropriate, components (D) and/or (E).

The following details refer to the material side of the novel PP-PA molding compositions according to the invention, the preparation thereof and the use thereof:

A) Suitable polypropylenes are known from polymer chemistry, are described, for example, in Kunststoff-Handbuch, Volume IV, Polyolefins, published by R. Vieweg, A. Schley and A. Schwarz, Carl Hanser Verlag, Munich, 1969, and are commercially available, so that further details are virtually superfluous.

Examples of the polypropylenes used are polypropylene homopolymers, in particular those which are prepared by polymerization of propylene in the presence of a Ziegler-Natta catalyst system and have a melt flow index MFI of from 0.1 to 10 g/10 min at 190° C. and 2.16 kg and have a modulus of elasticity at tension of greater than 300 N/mm$^2$.

However, suitable polypropylenes are also copolymers prepared, for example, by random copolymerization or block copolymerization from propylene and ethylene, α-olefins, for example 1-butene, 1-pentene, 3-methyl-1-pentene, 1-hexene, 1-heptene or 1-octene, or dienes, for example norbornadiene or dicyclopentadiene, and having a propylene content of greater than 80%, a modulus of elasticity at tension of greater than 500 N/mm$^2$ and a melting point of above 155° C.

Polypropylenes which are particularly preferably used are block copolymers made from propylene and ethylene having a crystallite melting point of above 160° C., a modulus of elasticity of greater than 600 N/mm$^2$ and an ethylene unit content of from 3 to 20% by weight, relative to the total weight of the copolymer.

B) As component (B), the thermoplastic PP-PA molding compositions according to the invention contain a polyamide or mixtures of more than one polyamide. Partly crystalline and amorphous PAs are suitable in principle, but partially crystalline PA is preferably used since the molding compositions prepared therefrom generally have superior heat-distortion resistance and stress cracking resistance than amorphous PA. PAs which can be employed according to the invention are known per se and include, for example, PAs having molecular weights of 5,000 and more, preferably from 5,000 to 70,000 and in particular from 10,000 to 65,000, as described, for example, in U.S. Pat. Nos. 2,071,250, 2,071,251, 2,130,523, 2,130,948, 2,241,322, 2,312,966, 2,512,906 and 3,393,210.

The PAs can be prepared, for example, by condensation of equimolar amounts of a saturated dicarboxylic acid having 4 to 12 carbon atoms, preferably 6 to 12 carbon atoms, with a diamine containing 4 to 14 carbon atoms, by condensation of Ω-aminocarboxylic acids or by polyaddition of lactams. Examples of PAs are polyhexamethyleneadipamide (nylon 66), polyhexamethyleneazaleamide (nylon 69), polyhexamethylenesebacamide (nylon 610), polyhexamethylenedodecanediamide (nylon 612), PAs obtained by a ring opening of lactams, such as polycaprolactam, and polylaurolactam, furthermore poly-11-aminoundecanoic acid and di-(p-aminocyclohexyl)methanedodecamide. It is also possible to use, according to the invention, PAs prepared by copolycondensation of two or more of the abovementioned polymers or synthesis components thereof, for example a copolymer of adipic acid, isophthalic acid and hexamethylenediamine. The PAs are preferably linear and have melting points of above 200° C., preferably from 205° to 310° C.

PAs which are preferably used are polyhexamethyleneadipamide, polyhexamethylenesebacamide and polycaprolactam. The PAs generally have a relative viscosity of from 2.5 to 5, preferably from 2.8 to 4.5, determined on a 1% strength by weight solution in H$_2$SO$_4$ at 23° C., which corresponds to a molecular weight (weight average) of from about 15,000 to 45,000. It is of course also possible to employ mixtures of two or more PAs. The proportion of PA (B) in the PP-PA molding composition according to the invention is expediently, as stated above, 10 to 89.5% by weight, based on the total weight. PP-PA molding compositions containing from 15 to 75% by weight, in particular 25 to 70% by weight, of PA (B) are particularly preferred.

C) As the synthesis component which is essential to the invention, the novel PP-PA molding compositions contain one or more olefinically unsaturated carboxylic acid, one or more olefinically unsaturated carboxylic acid derivative or mixtures thereof in an effective amount, preferably in an amount of from 0.1 to 5 parts by weight, in particular 0.2 to 2 parts by weight, based on 100 parts by weight of the PP-PA molding composition, in order to modify preferably PP or, if desired, mixtures of PP and an impact modifier (D). Examples of suitable carboxylic acids and derivatives are: olefinically unsaturated monocarboxylic acids and the corresponding tert.-butyl esters, for example acrylic acid, tert.-butyl acrylate, methacrylic acid and tert.-butyl methacrylate, olefinically unsaturated di-carboxylic acids and the corresponding mono- and/or di-tert.-butyl esters, for example itaconic acid, mono- or di-tert.-butyl itaconate, mono- or di-tert.-butyl fumarate, maleic acid, mono- or di-tert.-butyl maleate, and olefinically unsaturated dicarboxylic anhydrides, for example maleic anhydride. The carboxylic acids and derivatives which are suitable according to the invention may be employed individually or as mixtures. Itaconic acid and in particular fumaric acid and maleic anhydride are preferably used.

D) In addition to synthesis components (A) to (C), the PP-PA molding compositions according to the invention may contain impact modifiers, expediently impact-modifying elastomers, in order to improve the impact strength. Impact-modifying elastomers for PA and PP are known to those skilled in the art. Examples which may be mentioned are rubbers based on ethylene, propylene, butadiene or acrylate, or mixtures of these monomers.

Suitable impact-modifying elastomers are described, for example in Methoden der organischen Chemie (Houben-Weyl), Volume XIV/1, Makromolekulare Chemie (Georg-Thieme-Verlag, Stuttgart, 1961), pages 390 to 406, or in the monograph by C. B. Bucknal, "Toughened Plastics" (Applied Science Publishers, London, 1977).

Some examples of preferred types of such elastomers are described below:

A preferred group comprises the so-called ethylene-propylene (EPM) or ethylene-propylene-diene (EPDM) rubbers, which expediently have an ethylene:-propylene radical ratio in the range from 20:80 to 80:20, preferably 40:60 to 65:35.

These rubbers may likewise be modified by means of olefinically unsaturated carboxylic acids and/or derivatives, as mentioned under (C).

The Mooney viscosities (MLI+4/100° C.) of uncrosslinked EPM or EPDM rubbers of this type, whose gel contents are generally less than 1% by weight, are preferably in the range from 25 to 100, in particular 35 to 90 (measured on a large rotor after a running time of 4 minutes at 100° C. in accordance with DIN 53 523).

EPM rubbers generally have virtually no double bonds, while EPDM rubbers may contain from 1 to 20 double bonds/100 carbon atoms.

Examples of diene monomers for EPDM rubbers are conjugated dienes, such as isoprene and butadiene, non-conjugated dienes having 5 to 25 carbon atoms, for example penta-1,4-diene, hexa-1,4-diene, 2,5-dimethyl-hexa-1,5-diene, hepta-1,4-diene and octa-1,4-diene, cyclic dienes, such as cyclopentadiene, cyclohexadienes, cyclooctadienes and dicyclopentadienes, and alkenyl-norbornenes, such as 5-ethylidene-2-norbornene, 5-butylidene-2-norbornene, 2-methallyl-5 TM norbornene, 2-isopropenyl-5-norbornene and tricyclodienes, such as 3-methyltricyclo(5.2.1.-0.2.6)-3,8-decadiene, or mixtures thereof. Hexa-1,5-diene, ethylidenenorbornene and dicylopentadiene are preferably used. The diene content of the EPDM rubbers is preferably 0.5 to 10, in particular 1 to 8% by weight, based on the total weight of the rubber.

In addition, preferred impact-modifying elastomers (D) are graft copolymers with butadiene, butadiene-styrene or butadiene-acrylonitrile copolymers or acrylates as the graft base, as described, for example, in DE-A-1,694,173 (U.S. Pat. No. 3,564,077) and DE-A-2,348,377 (U.S. Pat. No. 3,919,353).

Of these, the so-called ABS polymers are particularly suitable, as described in DE-A-2,035,390, DE-A-2,248,242 and EP-A-22,216, those of EP-A-22,216 being particularly preferred.

The elastomers (D) may alternatively be graft polymers comprising
- 25 to 98% by weight of an acrylate rubber having a glass transition temperature of below −20° C. as the graft base and
- 2 to 75% by weight of a copolymerizable, ethylenically unsaturated monomer whose homopolymers or copolymers have a glass transition temperature of above 25° C., as the graft.

The graft base is an acrylate or methacrylate rubber, where up to 40% by weight of further comonomers may be present. The $C_1-C_8$-esters of (meth)acrylic acid and the halogenated derivatives thereof, and also aromatic acrylates and mixtures thereof, are preferably employed. Examples of comonomers in the graft base are acrylonitrile, methacrylonitrile, styrene, α-methylstyrene, acrylamides, methacrylamides and vinyl $C_1-C_6$-alkyl ethers.

The graft base may be uncrosslinked or partially crosslinked or fully crosslinked. The crosslinking is advantageously achieved by copolymerization with from 0.02 to 5% by weight, preferably 0.05 to 2% by weight, based on the weight of the graft base, of a crosslinking monomer containing more than one double bond. Suitable crosslinking monomers are described, for example, in DE-A-2,726,256 and EP-A-50,265.

Examples of crosslinking monomers which are preferably used are triallyl cyanurate, triallyl isocyanurate, triacryloylhexahydro-s-triazine and trialkylbenzenes.

If the crosslinking monomers contain more than 2 polymerizable double bonds, it is advantageous to limit their amount to not more than 1% by weight, based on the graft base.

Particularly preferred graft bases are emulsion polymers having a gel content of greater than 60% by weight (determined in dimethylformamide at 25° C. by the method of M. Hoffmann, H. Krömer, R. Kuhn, Polymeranalytik, Georg-Thieme-Verlag, Stuttgart, 1977).

Suitable graft bases are also acrylate rubbers having a diene core, as described, for example in EP-A-50,262.

Particularly suitable graft monomers are styrene, α-methylstyrene, acrylonitrile, methacrylonitrile and methyl methacrylate, or mixtures thereof, in particular those comprising styrene and acrylonitrile in the weight ratio from 90:10 to 50:50. It is furthermore possible to employ up to 20% by weight of comonomers, for example the comonomers mentioned below under (Dc).

The graft yield, i.e. the quotient of the amount of grafted-on monomer and the amount of graft monomer employed, is generally in the range from 20 to 80%.

Acrylate-based rubbers which can be used, for example, as elastomers (D) are described for example in DE-A-2,444,584 and DE-A-2,726,256.

Impact modifiers (D) which can preferably be used are furthermore ethylene copolymers in an effective amount, for example in an amount of from 0.5 to 30 parts by weight, preferably 2 to 25 parts by weight, based on 100 parts by weight of PP-PA molding composition.

Suitable ethylene copolymers expediently have, based on the total weight, an ethylene content (a) of from 50 to 98% by weight, preferably from 60 to 95% by weight, an alkyl (meth)acrylate content (b) of from 1 to 45% by weight, preferably 10 to 35% by weight, and a content of further comonomers (c) of from 1 to 40% by weight, preferably 2 to 20% by weight.

a) The monomer ethylene is sufficiently known in polymer chemistry for further details to be superfluous.

b) The acrylates and/or methacrylates (b) having 1 to 8 carbon atoms, preferably 2 to 8 carbon atoms, in the linear or branched alkyl are (meth)acrylates in which the ester groups of the polymerized (meth)acrylate units in the ethylene copolymer formed do not react significantly with the polyamide (B) under the reaction conditions for the preparation of the PP-PA molding compositions, or only do so to a minor extent. Examples which may be mentioned are methyl acrylate or methacrylate, ethyl acrylate or methacrylate, n- and i-propyl acrylate or methacrylate, n- and i-butyl acrylate or methacrylate, n-pentyl acrylate or methacrylate, n-hexyl acrylate or methacrylate, 2-ethylhexyl acrylate or methacrylate, n-heptyl acrylate or methacrylate and n-octyl acrylate or methacrylate. The alkyl (meth)acrylates may be employed individually or in the form of mixtures. n-Butyl acrylate and/or 2-ethylhexyl acrylate are preferably used.

c) Suitable comonomers (c) are olefinically unsaturated monomers which can be copolymerized with ethylene and alkyl (meth)acrylates and contain a reactive group in bonded form which reacts, in the ethylene copolymer formed, with the polyamide (B) under the reaction conditions for the preparation of the PP-PA molding compositions, the chemical linking occurring to such an extent that the degree of coupling to the PA when the reaction is complete is greater than 0.03 and is preferably from 0.05 to 1 and in particular 0.08 to 0.8. The degree of coupling here is defined as the ratio of ethylene copolymer which cannot be extracted from the PP-PA molding composition using toluene to the total amount of ethylene copolymer employed.

Examples of groups which are reactive with the PA (B) are sulfo, sulfonyl, oxazoline and epoxide groups and preferably carbonyl, tert.-butylcarboxylate and carboxylic anhydride groups.

Examples of suitable comonomers (c) for the preparation of the ethylene copolymers are olefinically unsaturated monocarboxylic acids, for example acrylic acid or methacrylic acid, and the corresponding tert.-butyl esters, for example tert.-butyl (meth)acrylates, olefinically unsaturated dicarboxylic acids, for example fumaric acid and maleic acid, and the corresponding mono- and/or di-tert.-butyl esters, for example mono- or di-tert.-butyl fumarate and mono- or di-tert.-butyl maleate, olefinically unsaturated dicarboxylic anhydrides, for example maleic anhydride, sulfo- or sulfonyl-containing olefinically unsaturated monomers, for example p-styrenesulfonic acid, 2-(meth)acrylamido-2-methylpropenesulfonic acid or 2-sulfonyl (meth)acrylate, oxazoline-containing olefinically unsaturated monomers, for example vinyloxazolines and vinyloxazoline derivatives, and epoxide-containing olefinically unsaturated monomers, for example glycidyl (meth)acrylate or allyl glycidyl ether.

Comonomers (c) which have proven particularly successful and are therefore preferably used are acrylic acid, methacrylic acid, tert.-butyl (meth)acrylate and/or in particular maleic anhydride.

The comonomers (c) mentioned may be employed, like the alkyl (meth)acrylates, individually or in the form of mixtures for the preparation of the ethylene copolymer.

The ethylene copolymers can be prepared by conventional processes, preferably by random copolymerization under superatmospheric pressure, for example at from 200 to 4,000 bar, and at elevated temperature, for example at from approximately 120° to 300° C. Appropriate processes are described in the literature and in patent publications.

The melt flow index of suitable ethylene copolymers is advantageously in the range from 1 to 80 g/10 min, preferably 2 to 25 g/10 min (measured at 190° C. and a load of 2.16 kg in accordance with DIN 53 735).

The elastomers (D) preferably have a glass transition temperature of below $-30°$ C., in particular below $-40°$ C., which results in good impact strength even at low temperatures.

The elastomers or rubbers mentioned as examples of impact modifiers (D) may be employed either individually or in the form of mixtures.

E) Besides synthesis components (A) to (C) and, if appropriate, (D), the PP-PA molding compositions according to the invention may furthermore contain reinforcing agents and/or additives (E). The proportion of this component (E) is, as stated above, up to 60 parts by weight, preferably up to 50 parts by weight, based on 100 parts by weight of the PP-PA molding composition.

Reinforcing agents which can be used as reinforcing fillers, for example asbestos, charcoal or preferably fibers, for example carbon fibers or in particular glass fibers, which may be treated with coupling agents and/or sizes. Suitable glass fibers which are also employed, for example, in the form of glass fabrics, mats and non-wovens and/or preferably glass silk rovings or cut glass silk made from low-alkali E-glasses having a diameter of from 5 to 200 μm, preferably 8 to 15 μm, generally have, after their incorporation into the PP-PA molding compositions, a mean fiber length of from 0.05 to 1 mm, preferably 0.1 to 0.5 mm.

Examples of other suitable fillers, besides the above-mentioned, are wollastonite, calcium carbonate, magnesium carbonate, amorphous silica, calcium silicate, calcium metasilicate, quartz sand, talc, kaolin, mica, feldspar, glass beads, Si nitride or boron nitride, and mixtures of these fillers.

Glass fibers, in particular, have proven particularly advantageous, particularly if high heat-distortion resistance is required.

Examples of suitable additives are free-radical initiators, stabilizers and oxidation retardants, agents against thermal decomposition and decomposition due to ultraviolet light, lubricants and mold-release agents, colorants, such as dyes and pigments, nucleating agents and plasticizers.

Free-radical initiator molecules, called free-radical initiators below, having a decomposition temperature t 1/2 per hour of above 140° C., preferably from 145° to 170° C., have proven successful for accelerating the reaction of components (A) and, if appropriate (D) with (C) in the melt. Examples of suitable free-radical initiators of this type, which are usually employed in an amount of from 0.1 to 20% by weight, preferably 0.1 to 10% by weight, based on the weight of component (C), are cumene hydroperoxide, di-tert.-butyl hydroperoxide, tert.-butyl hydroperoxide and hexamethylcyclo-4,7-diperoxynonane.

Cumene hydroperoxide and hexamethylcyclo-4,7-diperoxynonane are preferably used.

Examples of oxidation retardants and thermal stabilizers which can be added to the PP-PA molding compositions according to the invention are halides of metals from group I of the Periodic Table, for example sodium halides, potassium halides and lithium halides, if desired in combination with copper(I) halides, for example chlorides, bromides or iodides. Furthermore, sterically hindered phenols, hydroquinones, substituted representatives of this group, and mixtures thereof, may be employed, preferably in concentrations of up to 1% by weight, based on the weight of the molding composition.

Examples of UV stabilizers are various substituted resorcinols, salicylates, benzotriazoles and benzophenones, which are generally employed in amounts of up to 2.0% by weight, based on the weight of the molding composition.

Lubricants and mold-release agents, which are usually also added in amounts of up to 1% by weight, based on the weight of the PP-PA molding composition, are stearic acids, stearyl alcohol, stearic acid esters and amides, and the fatty acid esters of pentaerythritol.

It is furthermore possible to add organic dyes, such as nigrosin, pigments, for example titanium dioxide, cadmium sulfide, cadmium sulfide selenide, phthalocyanins, ultramarine blue or carbon black. Nucleation agents, such as calcium fluoride, sodium phenyl phosphinate, aluminum oxide or finely divided polytetrafluoroethylene may be used in amounts, for example, of up to 5% by weight, based on the synthesis components (A) to (E).

The PP-PA molding compositions according to the invention are prepared at from 200° to 300° C., preferably 240° to 300° C., and at an overall residence time of from 30 to 600 seconds, preferably 40 to 300 seconds, in the molten state of the synthesis components (A) to (C) and, if appropriate (D) in a suitable mixer, for example a kneader, preferably a twin-screw extruder or mixing extruder for transfer molding. The modification of PP (A) by means of the olefinically unsaturated carboxylic acid and/or the carboxylic acid derivative (C) is expediently carried out in the first reaction step in the absence or preferably in the presence of one or more free-radical initiator and advantageously in the presence of one or more impact modifier.

Using the most expedient preparation process for the PP-PA molding compositions according to the invention, and therefore the one which is preferably used, 10 to 89.9 parts by weight of one or more polypropylene homopolymer and/or copolymer (A) and 0.1 to 5.0 parts by weight of one or more olefinically unsaturated carboxylic acid, of one or more olefinically unsaturated carboxylic acid derivative or mixtures thereof, in each case based on 100 parts by weight of the molding composition, are melted and combined in the presence of a free-radical initiator and preferably in the presence of an impact modifier in a first reaction zone of an extruder which corresponds to the first reaction step. After this reaction zone has been passed through, 10 to 89.9 parts by weight of one or more PA (B) and, if appropriate, the remainder or all of the impact modifier (D) and, if desired, reinforcing agents and/or additives (E) are introduced into the modified PP melt, for example via a side extruder or a stuffing screw. In a second reaction zone of the extruder, which corresponds to the second reaction step, the modified PP melt from the first reaction zone and the freshly added synthesis components are melted to form the PP-PA molding compositions according to the invention. The melting of the components in the first and second reaction steps is preferably carried out at the same temperature, the residence time in the first reaction step being from 20 to 200 seconds, preferably 20 to 100 seconds, and in the second reaction step being from 10 to 400 seconds, preferably 20 to 400 seconds. The melt of the PP-PA molding composition obtained is then extruded, cooled and granulated. The granules obtained can be temporarily stored or used directly for the production of, for example films or preferably moldings.

The PP-PA molding compositions according to the invention are homogeneous and do not exhibit separation of the polymer components either in the melt or in the granules or moldings. Moldings having good surface quality, high heat-distortion resistance and improved impact strength with high rigidity, in particular at low temperatures, for example at −40° C., can easily be produced from the PP-PA molding compositions. The PP-PA molding compositions are furthermore suitable for the production of films by customary processes.

EXAMPLES

The following synthesis components were employed in Examples 1 to 20 and Comparative Examples I to VIII for the preparation of thermoplastic PP-PA molding compositions according to the invention.

Polypropylene (A)

PP-A1: Polypropylene block copolymer containing 6% by weight of polymerized ethylene units and having an MFI of 1.8 g/10 min, measured at 230° C. at a load of 2.16 kg in accordance with DIN 53 735.

The polypropylene-polyethylene block copolymer had a tensile modulus (+23° C.) of 1300 N/mm$^2$ and a melting point of 164° C. (Novolen® 2300 HX from BASF AG).

PP-A2: Polypropylene block copolymer containing 10% by weight of polymerized ethylene units.

The polypropylene-polyethylene block copolymer had an MFI of 1.6, measured under the above-mentioned conditions, a tensile modulus (+23° C.) of 1200 N/mm$^2$, and a melting point of 162° C. (Novolen® 2500 HX from BASF AG).

PP-A3: Polypropylene block copolymer containing 18% by weight of polymerized ethylene units.

The polypropylene-polyethylene block copolymer had an MFI of 2.0, measured under the above-mentioned conditions, a tensile modulus (+23° C.) of 800 N/mm$^2$, and a melting point of 160° C.

PP-A4: Polypropylene, grafted with 1.3% by weight of acrylic acid.

The polymer had an MFI of 3.0, measured under the abovementioned conditions, a tensile modulus (+23° C.) of 1400 N/mm$^2$, and a melting point of 160° C.

Polyamide (B)

PA-B1: Polycaprolactam having a relative viscosity of 3.5 (measured in 0.5% strength by weight solution in phenol/o-dichlorobenzene in a weight ratio 1:1 at 25° C.).

PA-B2: Polyhexamethylenesebacamide having a relative viscosity of 3.23 (measured as described under PA-B1).

Component (C)

Olefinically unsaturated carboxylic acid or derivatives thereof

FA: Fumaric acid

MA: Maleic anhydride

Component (D)

The following rubbers were employed as impact modifiers:

D1: Terpolymer comprising ethylene, n-butyl acrylate and acrylic acid in the weight ratio 65:30:5, prepared by high-pressure polymerization as described in EP-A-0,106,999. The terpolymer had an MFI of 10 g/10 min, measured at 190° C. at a load of 2.16 kg in accordance with DIN 53 735.

D2: Terpolymer comprising ethylene, n-butyl acrylate and maleic anhydride in the weight ratio 65:35:0.5, prepared as described under D1.

The terpolymer had an MFI of 12 g/10 min, measured at 190° C. at a load of 2.16 kg.

D3: Terpolymer comprising ethylene, n-butyl acrylate and glycidyl methacrylate in the weight ratio 67:30:3, prepared as described under D1.

The terpolymer had an MFI of 9 g/10 min, measured at 190° C. at a load of 2.16 kg.

D4: Graft rubber having a graft base (75% by weight) of poly-n-butyl acrylate which had been reacted with butanediol diacrylate, and a graft sheath (25% by weight) of a copolymer of styrene, acrylonitrile and tert.-butyl acrylate (weight ratio 73:24:3), prepared by emulsion polymerization in a conventional manner. (Mean particle diameter $d_{50}$=420 nm).

D5: Graft rubber having a graft base of polybutadiene (75%) and a graft sheath (25%) of a copolymer of styrene, acrylonitrile and tert.-butyl acrylate (ratio by weight 73:24:3), prepared by emulsion polymerization in a conventional manner. (Mean particle diameter $d_{50}$=250 nm).

The mean particle diameter $d_{50}$ is the diameter greater than 50% by weight of the particles and less than 50% by weight of the particles.

Reinforcing agent (E):

E: Glass fiber type R 20 EX 4 from European Owens Corning Fiberglas, B-4651 Battice, Belgium Free-radical initiator:

CHP: Cumene hydroperoxides.

Preparation of the PP-PA molding compositions:

General preparation procedure:

The synthesis components (A) and (C) and, if desired, the free-radical initiator were homogeneously mixed at 23° C. in a high-speed mixer, the mixture was transferred into a Werner und Pfleiderer (Stuttgart) ZSK 40 twin-screw extruder, melted at 260° C. and extruded through a reaction zone 14 D in length. The residence time was about 40 seconds.

A melt of components (B) and (D) at 260° C. was then fed in using a flange-mounted Werner und Pfleiderer ZSK 30 side extruder.

Where appropriate, the reinforcing fibers (E) were introduced into the combined melts by means of a further side inlet.

After a residence time of 200 seconds, the PP-PA molding compositions were extruded, cooled, granulated and injection-molded to form test specimens.

The mechanical properties below were measured on the test specimens in accordance with DIN standards:

The notched impact strength in accordance with DIN 53 753, the impact strength in accordance with DIN 53 453, the tensile strength in accordance with DIN 53 455, the modulus of elasticity in accordance with DIN 53 457, and the Vicat B heat-distortion resistance in accordance with DIN 53 460. The conditioning was carried out for 30 days at 23° C. and a relative atmospheric humidity of 50%.

The type and amount (% by weight, based on the total weight of the molding compositions) of the synthesis components and the mechanical properties measured on the test specimens are summarized shown in Tables 1 and 2 below.

Table 1 shows the mechanical properties of the test specimens, prepared in the absence or with addition of impact modifiers (D) and of the test specimens in accordance with the comparative examples.

The test specimens in Table 2 were produced in the absence of an impact modifier (D), but with addition of the reinforcing agent (E).

TABLE 1

| | Synthesis components | | | | | | | | | Mechanical properties | | | | |
|---|---|---|---|---|---|---|---|---|---|---|---|---|---|---|
| | A | | B | | C | | D | | CHP | Modulus of elasticity | | Notched impact strength $-40°$ C. [kJ/m$^2$] | Impact strength 23° C. [kJ/m$^2$] | Vicat B [°C.] |
| | A-mount [parts by wt.] | Type | A-mount [parts by wt.] | Type | A-mount [parts by wt.] | Type | A-mount [parts by wt.] | Type | A-mount [parts by wt.] | Dry [N/mm$^2$] | Moist 23° C. [N/mm$^2$] | | | |
| Ex. | | | | | | | | | | | | | | |
| 1 | 49.5 | A1 | 50 | B1 | 0.5 | MA | — | — | — | 2050 | 1650 | 16 | without fracture | 105 |
| 2 | 49.5 | A2 | 50 | B1 | 0.5 | MA | — | — | — | 2000 | 1600 | 21 | without fracture | 102 |
| 3 | 49.5 | A3 | 50 | B1 | 0.5 | MA | — | — | — | 1900 | 1500 | 34 | without fracture | 92 |
| 4 | 49.5 | A2 | 50 | B2 | 0.5 | MA | — | — | — | 2100 | 1700 | 19 | without fracture | 103 |
| 5 | 49.5 | A2 | 50 | B1 | 0.5 | MA | — | — | — | 2000 | 1600 | 20 | without fracture | 102 |
| 6 | 49.75 | A2 | 50 | B1 | 0.25 | MA | — | — | — | 2050 | 1650 | 22 | without fracture | 103 |
| 7 | 69.65 | A2 | 20 | B1 | 0.4 | MA | — | — | — | 1400 | 1100 | 28 | without fracture | 65 |
| 8 | 39.8 | A2 | 30 | B1 | 0.35 | MA | — | — | — | 1600 | 1350 | 25 | without fracture | 81 |
| 9 | 49.5 | A2 | 60 | B1 | 0.2 | MA | — | — | — | 2300 | 1900 | 16 | without fracture | 124 |
| 10 | 49.5 | A2 | 50 | B1 | 0.45 | MA | — | — | 0.05 | 2000 | 1600 | 22 | without fracture | 101 |
| 11 | 49.5 | A2 | 40 | B1 | 0.5 | MA | 10 | D1 | — | 1600 | 1250 | 25 | without fracture | 88 |
| 12 | 49.5 | A2 | 40 | B1 | 0.5 | MA | 10 | D2 | — | 1600 | 1200 | 31 | without fracture | 89 |
| 13 | 49.5 | A2 | 40 | B1 | 0.5 | MA | 10 | D3 | — | 1600 | 1200 | 27 | without fracture | 87 |
| 14 | 49.5 | A2 | 40 | B1 | 0.5 | MA | 10 | D4 | — | 1650 | 1300 | 30 | without fracture | 93 |
| 15 | 49.5 | A2 | 40 | B1 | 0.5 | MA | 10 | D5 | — | 1650 | 1300 | 35 | without fracture | 92 |
| Comparative Examples | | | | | | | | | | | | | | |
| I | 100 | A1 | — | — | — | — | — | — | — | 1300 | 1300 | 17 | 71 | 64 |
| II | 100 | A2 | — | — | — | — | — | — | — | 1200 | 1200 | 30 | 96 | 57 |
| III | 100 | A3 | — | — | — | — | — | — | — | 800 | 800 | 41 | without fracture | 53 |
| IV | — | — | 100 | B1 | — | — | — | — | — | 2950 | 1400 | 5 | without fracture | 199 |
| V | — | — | 100 | B2 | — | — | — | — | — | 3100 | 1500 | 4 | without fracture | >200 |
| VI | — | — | 90 | B1 | — | — | 10 | D1 | — | 2600 | 1100 | 6 | without fracture | 179 |
| VII | 50 | A2 | 50 | B1 | — | — | — | — | — | 2000 | 1600 | 1 | 15 | 104 |
| VIII | 50 | A4 | 50 | B1 | — | — | — | — | — | 2100 | 1700 | 2 | 26 | 103 |

TABLE 2

| | Synthesis components | | | | | | | Mechanical properties | | |
|---|---|---|---|---|---|---|---|---|---|---|
| | A | | B | | C | | E | Modulus of elasticity | Tensile strength [23° C.] | Impact strength |
| | Amount [parts | | Amount [parts | | Amount [parts | | Amount [parts | | | |
| Ex. | by wt.] | Type | by wt.] | Type | by wt.] | Type | by wt.] | [N/mm$^2$] | [N/mm$^2$] | [kJ/m$^2$] |
| 16 | 34.8 | A1 | 35 | B1 | 0.2 | MA | 30 | 7700 | 108 | 25 |
| 17 | 34.8 | A2 | 35 | B1 | 0.2 | MA | 30 | 7600 | 102 | 31 |
| 18 | 34.8 | A3 | 35 | B1 | 0.2 | MA | 30 | 7400 | 98 | 33 |
| 19 | 34.8 | A2 | 35 | B2 | 0.2 | MA | 30 | 7700 | 108 | 27 |
| 20 | 39.7 | A2 | 40 | B1 | 0.2 | MA | 20 | 6100 | 94 | 34 |

We claim:

1. A thermoplastic polypropylene-polyamide molding comprising, in each case based on 100 parts by weight of the molding composition,
   A) 10 to 89.9 parts by weight of one or more polypropylene homopolymer, copolymer, or mixture thereof,
   B) 10 to 89.9 parts by weight of one or more polyamide,
   C) 0.1 to 5.0 parts by weight of one or more olefinically unsaturated carboxylic acid, one or more olefinically unsaturated carboxylic acid derivative, or mixture thereof,
   D) 0 to 30.0 parts by weight of an impact modifying elastomer, and
   E) 0 to 60.0 parts by weight of an additive selected from the group consisting of reinforcing agents, fillers free-radical initiators, stabilizers and oxidation retardants, agents against thermal decomposition and decomposition due to ultraviolet light, lubricants and mold-release agents, colorants, nucleating agents, plasticizers, and mixtures thereof,
   prepared by a process consisting of melting together in a customary mixer at from 200° to 300° C. components (A) and (C) in a first reaction step and then, in a second reaction step, introducing component (B), into the melt of compounds (A) and (C), and, if desired, (D), (E), or a mixture thereof.

2. The thermoplastic polypropylene-polyamide molding composition as claimed in claim 1, wherein the olefinically unsaturated carboxylic acid or the olefinically unsaturated carboxylic acid derivative is selected from the group consisting of olefinically unsaturated monocarboxylic acids and the corresponding tert.-butyl esters, olefinically unsaturated dicarboxylic acids and the corresponding tert.-butyl esters, and olefinically unsaturated dicarboxylic anhydrides.

3. The thermoplastic polypropylene-polyamide molding composition as claimed in claim 1, wherein the olefinically unsaturated carboxylic acids or derivatives thereof are selected from the group consisting of acrylic acid, methacrylic acid or tert.-butyl esters thereof, itaconic acid, fumaric acid, maleic acid or mono- or di-tert.-butyl esters thereof, and maleic anhydride.

4. The thermoplastic polypropylene-polyamide molding composition as claimed in claim 1 wherein the olefinically unsaturated carboxylic acids or derivatives thereof are selected from the group consisting of itaconic acid, fumaric acid and maleic anhydride.

* * * * *